United States Patent
Brüggenbrock et al.

(10) Patent No.: US 10,898,942 B2
(45) Date of Patent: Jan. 26, 2021

(54) METHOD FOR THE PRODUCTION OF A CLOSED HOLLOW PROFILE FOR A VEHICLE AXLE

(71) Applicant: Benteler Automobiltechnik GmbH, Paderborn (DE)

(72) Inventors: Michael Brüggenbrock, Rosendahl (DE); Thomas Flehmig, Ratingen (DE); Thomas Flöth, Duisburg (DE); Thomas Grosserüschkamp, Duisburg (DE); Norbert Niggemeyer, Paderborn (DE); Andreas Frehn, Delbruck (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 737 days.

(21) Appl. No.: 15/248,362

(22) Filed: Aug. 26, 2016

(65) Prior Publication Data

US 2017/0066036 A1    Mar. 9, 2017

(30) Foreign Application Priority Data

Sep. 7, 2015  (DE) .................... 10 2015 114 943

(51) Int. Cl.
  B21D 53/88   (2006.01)
  B21D 5/06    (2006.01)
  (Continued)

(52) U.S. Cl.
  CPC ............. B21D 53/88 (2013.01); B21D 5/06 (2013.01); B21D 22/02 (2013.01); B21D 22/26 (2013.01);
  (Continued)

(58) Field of Classification Search
  CPC ........ B60G 2206/20; B60G 2206/8102; B60G 2206/8103; B60G 2206/203; B60B 35/08; B60B 2310/206; B60B 2310/212
  See application file for complete search history.

(56) References Cited

U.S. PATENT DOCUMENTS 5,507,518 A * 4/1996 Nakahara ............... B60G 7/008
                                            267/273
6,709,536 B1 * 3/2004 Kim ......................... C22C 1/002
                                            148/403
(Continued)

FOREIGN PATENT DOCUMENTS

DE     10139661 C1 *  2/2003   ........... B62D 27/026
DE     10139661 C1    2/2003
(Continued)

OTHER PUBLICATIONS

Machine Translation of JP 07-186654, Translated Nov. 29, 2018, 5 Pages. (Year: 2005).*
(Continued)

Primary Examiner — Gregory D Swiatocha
(74) Attorney, Agent, or Firm — The Webb Law Firm

(57) ABSTRACT

A method for the production of a closed hollow profile for a vehicle axle including the following steps: a) provision of a board made out of a sheet of metal, wherein the board has at least a length in a longitudinal direction and at least a width in a transverse direction, b) forming of the board, creating an open profile with a channel running in a longitudinal direction of the board, c) forming the lateral surfaces of the board, creating a hollow profile with a circumference and a longitudinal gap and d) joining together the longitudinal gap.

10 Claims, 5 Drawing Sheets

(51) Int. Cl.
  *B60B 35/16* (2006.01)
  *B21D 22/02* (2006.01)
  *B21D 22/26* (2006.01)
  *B60B 35/08* (2006.01)

(52) U.S. Cl.
  CPC ............ *B60B 35/08* (2013.01); *B60B 35/16* (2013.01); *B60B 2310/20* (2013.01); *B60B 2310/206* (2013.01); *B60B 2310/212* (2013.01); *B60B 2310/30* (2013.01); *B60B 2310/302* (2013.01); *B60B 2310/303* (2013.01); *B60B 2310/318* (2013.01); *B60B 2360/102* (2013.01); *B60B 2360/141* (2013.01)

(56) References Cited

U.S. PATENT DOCUMENTS

| | | | |
|---|---|---|---|
| 6,790,536 B2 | 9/2004 | Schonleber et al. | |
| 2001/0013242 A1* | 8/2001 | Kondou | B21C 37/104 72/379.2 |
| 2003/0122344 A1* | 7/2003 | Herzig | B60G 21/051 280/124.166 |
| 2010/0009114 A1* | 1/2010 | Kim | B21D 35/00 428/99 |
| 2011/0260423 A1* | 10/2011 | Lepre | B21C 1/24 280/124.131 |
| 2015/0165511 A1* | 6/2015 | Higai | B21D 39/02 72/379.2 |

FOREIGN PATENT DOCUMENTS

| | | | |
|---|---|---|---|
| DE | 102009031981 A1 * | 8/2010 | ............ B21D 53/88 |
| DE | 102009031981 A1 | 8/2010 | |
| EP | 1036678 A2 | 9/2000 | |
| EP | 2939849 A1 | 4/2015 | |
| JP | 7186654 A * | 7/1995 | |
| JP | 2010194611 A | 9/2010 | |
| WO | 2007138074 A1 | 12/2007 | |

OTHER PUBLICATIONS

Machine translation of DE 102009031981 A1, translated Jan. 7, 2020, 8 Pages. (Year: 2010).*
Machine translation of DE 101 39 661, 16 Pages. (Year: 2003).*

* cited by examiner

Fig.3
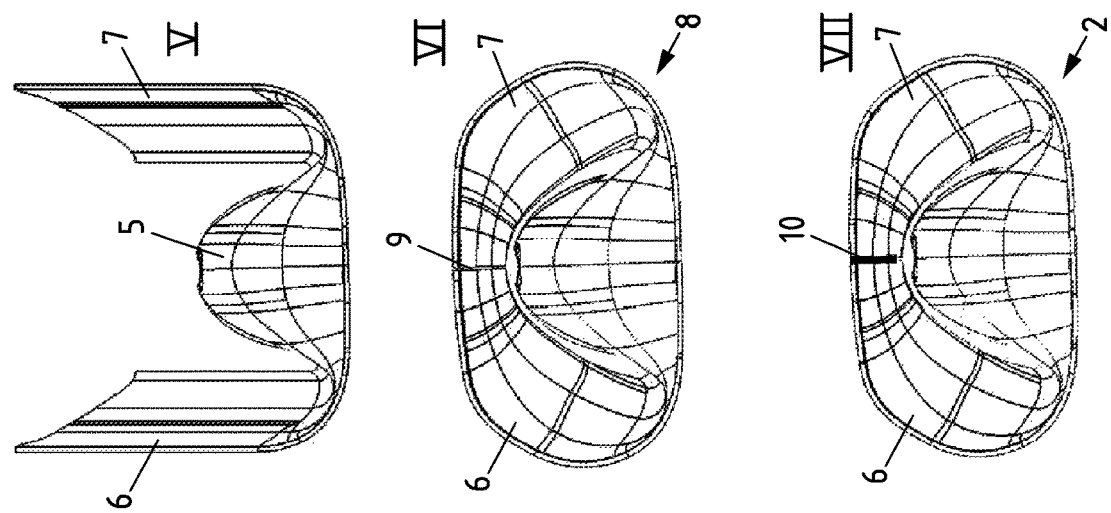
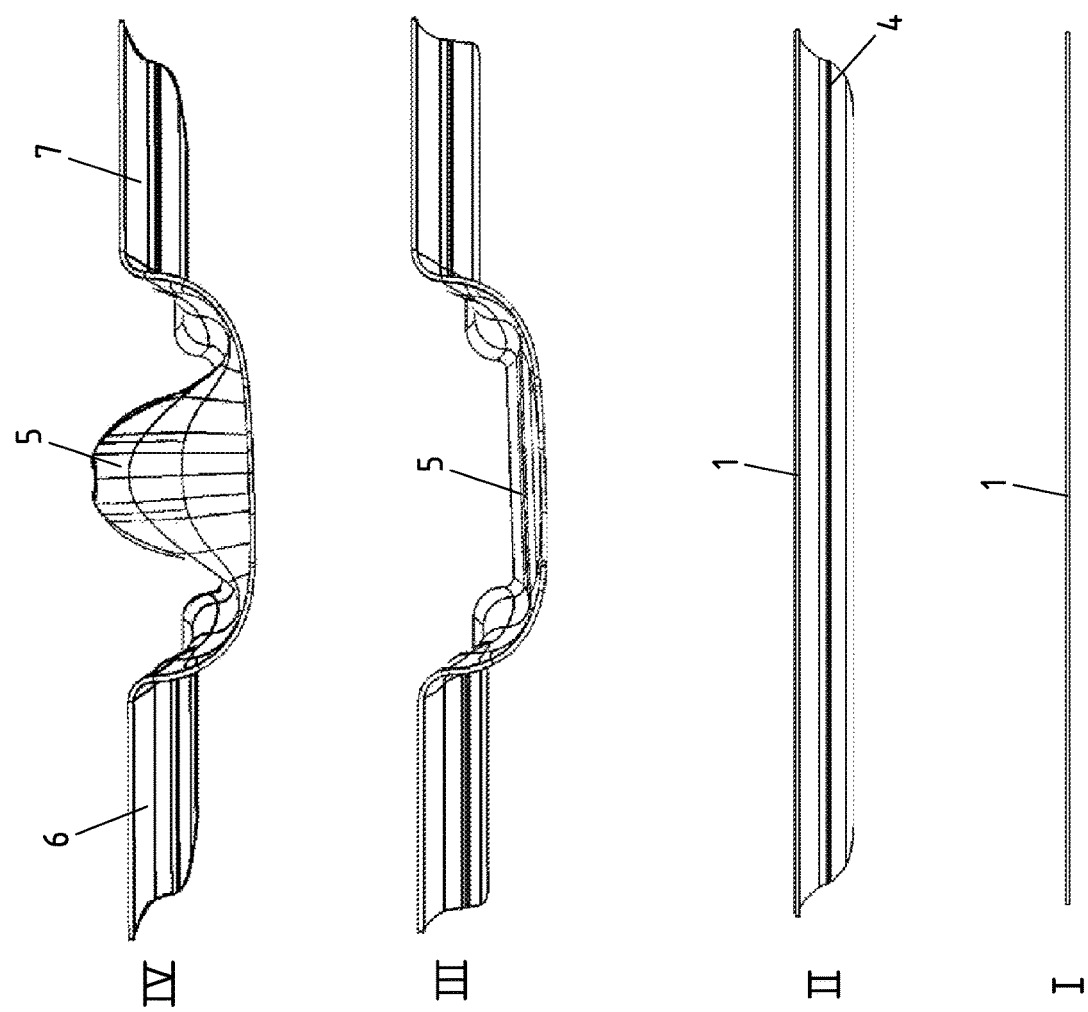

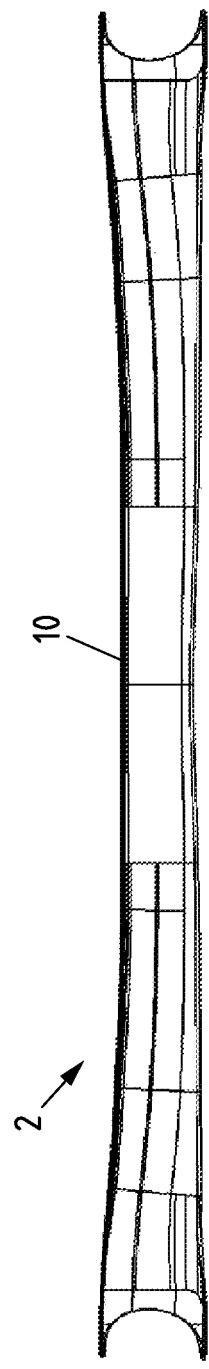
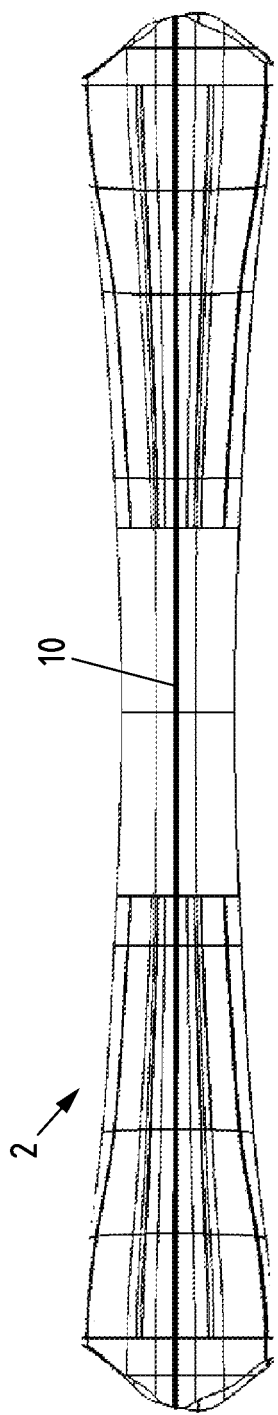
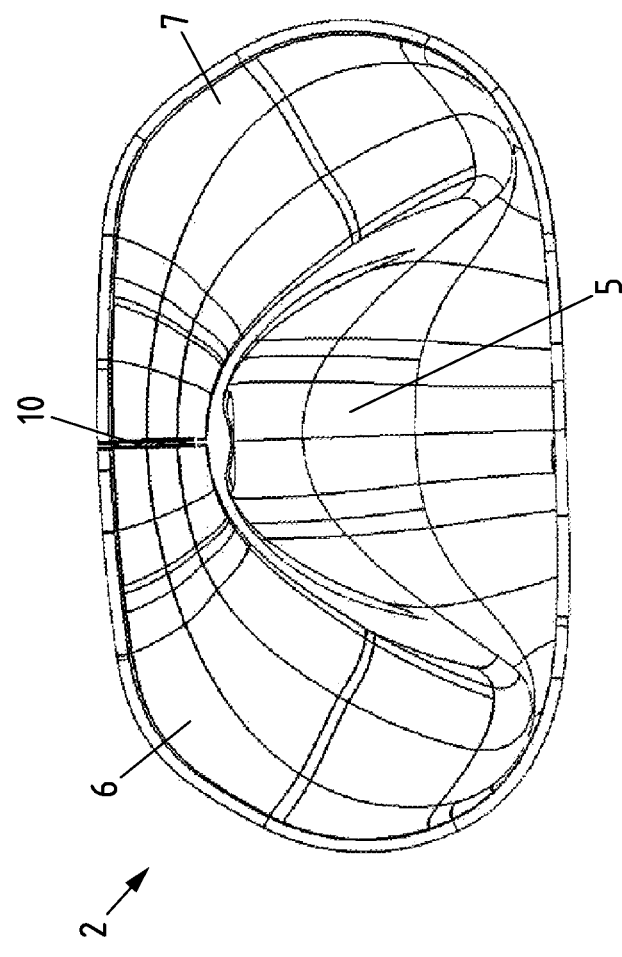

METHOD FOR THE PRODUCTION OF A CLOSED HOLLOW PROFILE FOR A VEHICLE AXLE

CROSS-REFERENCE TO RELATED APPLICATION

This application claims priority to German Patent Application No. 10 2015 114 943.5 filed Sep. 7, 2015, the disclosure of which is hereby incorporated in its entirety by reference.

BACKGROUND OF THE INVENTION

The invention relates to a method for the production of a closed hollow profile for a vehicle axle comprising the following steps: a) provision of a board made out of a sheet of metal, wherein the board has at least a length in a longitudinal direction and at least a width in a transverse direction, b) forming of the board, creating an open profile with a channel running in a longitudinal direction of the board, c) forming the lateral surfaces of the board, creating a hollow profile with a circumference and a longitudinal gap and d) joining together the longitudinal gap.

FIELD OF THE INVENTION

Various axles and wheel suspensions are known in the field of chassis technology. Originally, axles created a rigid transverse connection between rotatably mounted wheels ("rigid axle"). Later the rigid connection between the two wheels was given up. Instead, the wheel is mounted on a wheel carrier, which is movably connected to the vehicle body by means of several guide rods ("single-wheel suspension").

What is known as a "semi-rigid axle" is a compromise between a rigid axle and single-wheel suspension, the most well-known variant of which is the "twist-beam rear suspension". Like rigid axles, semi-rigid axles also form a mechanical connection between the two wheels. Nevertheless, unlike rigid axles, semi-rigid axles enable a relative movement between the two wheels. This is usually achieved by means of a targeted elastic torsion deformation of the transverse carrier of the semi-rigid axle. The transverse carrier is often a hollow profile. The torsional stiffness of the transverse carrier normally varies along its length: efforts are made to ensure high torsional stiffness at the two ends of the transverse carrier in order to enable a reliable connection of the longitudinal carriers and in the centre of the transverse carrier efforts are made to ensure a lower torsional stiffness in order to enable a relative movement between the wheels. Against this background it becomes clear that a hugely complex geometry of the transverse carrier is often required. There are therefore special requirements on the production of these components.

An option for the production of torsion profiles of this kind for axles known from the prior art is initially producing a welded pipe, ground to measure, in a separate, mostly continuous process and then pressing the central section of the finished pipe into a U shape using a stamp in order to decrease the torsional stiffness in this section in a controlled manner. However, this production technique has several disadvantages. One disadvantage is the fact that in order to press the pipe, a material with a high degree of bending capacity is required. This means that many high-strength or super high-strength materials cannot be used. A further disadvantage is the limited freedom of design, as a pipe with a constant circumference can only be formed into torsion profiles with almost constant circumferences.

An alternative method for the production of a torsion profile from a metal board is known from DE 10 2009 031 981 A1 in which the central section, in other words the "transverse carrier" is supposed to form a twist-beam suspension. In order to do this, a rectangular board is formed into a hollow profile in several steps. The longitudinal edges of the board are then welded to one another in order to form a closed hollow profile. One challenge of this method, however, is the creation of a reliable weld connection. Forming the board several times meant the two longitudinal edges often spring back somewhat after the forming steps, so no clean butt joint is created between the longitudinal edges for welding. Since the cross sectional area of the torsion profile changes along its length, the two longitudinal edges often also spring back to different extents along the length. This can lead to a gap with a changing gap width, making welding even more difficult.

The object of the invention is therefore to design and further develop the method described at the outset and previously described in greater detail such that a reliable joining of the hollow profile is enabled with a high degree of repeat accuracy.

This object is achieved by a method in accordance with the present disclosure in that the board is formed such that a compressive stress is generated at least in the region of the longitudinal gap, in particular at the sheet metal level.

SUMMARY OF THE INVENTION

The method in accordance with the invention is used to produce a closed hollow profile for a vehicle axle. The hollow profile can in particular be a torsion profile, for example a twist-beam suspension about the transverse carrier. The method sets out the provision of a board made of sheet metal, wherein the board has at least a length in a longitudinal direction and at least a width or a mould contour in a transverse direction. The length is preferably significantly longer than the width. A board can in particular be designed to be rectangular and therefore to have a length in a longitudinal direction and a width in a transverse direction, or designed as a tailored blank and have several lengths transverse to the longitudinal direction and several widths longitudinal to the transverse direction. The method also provides for at least two forming steps: firstly, the board should be formed such that an open profile is generated with a channel running in a longitudinal direction of the board. Channel is understood to mean a longitudinal hollow or a longitudinal recess. The lateral surfaces of the board are then to be formed such that a hollow profile having a circumference and having a longitudinal gap is created. The areas to the side of the channel are designated lateral surfaces. Since the hollow profile had a longitudinal gap, it is (still) not a closed hollow profile. Finally, the method provides for the joining of the longitudinal gap, turning the open hollow profile into a closed hollow profile.

In accordance with the invention, the suggestion is made that the board is formed such that at least on the region of the longitudinal gap a compressive stress is generated, in particular at the sheet metal level. In particular a compressive stress should be generated in the longitudinal gap, in particular at the level of the sheet metal, after steps b) and c) and before step d). The board should be formed such that a contact is generated between the two lateral surfaces of the board, which form the longitudinal gap. The contact can be created at one or at several locations along the length of the profile. Preferably, a continuous contact is generated along the entire length of the longitudinal gap. The compressive stress generated in the longitudinal gap has two advantages. Firstly, during the profile forming the compressive stress causes an outwards curvature of the areas near to the edge. The curvature leads to the longitudinal edges contacting one another for example at an edge joint in order to form precisely one contact and set a desired precise distance between the longitudinal gap and the opposite region of the hollow profile—the channel. Secondly, the compressive stress generated leads to a reduction in spring-back, preventing too great a cracking of the components after removal from the forming die. These effects ensure a secure, repeatable forming and an essentially tension-free joining of the longitudinal gap. A compressive stress can be achieved for example by means of an "excess of material". The compressive stress is preferably in the region of the longitudinal gap above the material yield point. The compressive stress is highest at the edge joint. The area adjacent to the longitudinal gap (longitudinal gap area) is also affected by the compressive stress generated, which can also contribute to a reduction in spring-back, wherein the level of the compressive stress decreases in an outwards direction away from the longitudinal gap.

In accordance with one embodiment of the invention, there is a provision for the width or the mould contour of the board to be larger in at least one place than the circumference of the same point on the hollow profile generated during the forming. The use of board with a slightly enlarged width is a particularly simple option for obtaining a hollow profile with a compressive stress in the longitudinal gap and the longitudinal gap area after forming.

In a further embodiment of the method, the suggestion is made that in step a) a board out of steel, in particular made of high-strength or super high-strength steel or out of a modern high-strength multiphase steel (e.g. DP780, FB780 or CP800), is provided. Steel is characterised by its good formability and very good strength values. In addition to this, the use of steel enables the production of torsion profiles with relatively thin wall thicknesses and therefore a lower mass. In vehicle construction, a smaller ratio of "unsprung" masses (axes, wheels etc.) to "sprung" masses (vehicle structure) is the objective in order to keep fluctuations in wheel load low. Hollow profiles made of steel with low wall thicknesses can make a contribution to this.

A further embodiment of the method provides for the board having a thickness in the range from 0.5 mm to 4.0 mm, in particular between 1.0 mm and 3.0 mm. Boards with a thickness in the range indicated have proven to be a good compromise between sufficient stiffness (as thick as possible) and low weight and good formability (as thin as possible). The boards can have a constant, continuous thickness or different thicknesses (tailored blank, tailored strip or tailored rolled blank).

In accordance with a further embodiment of the method, it is possible for the boards to have an elongation at the break of less than 21%. Unlike when these are produced from a pipe, the production of the hollow profile from a flat board means that materials with a lower elongation at the break can also be used. This enables, for example, the use of high-strength and super high-strength steels.

In accordance with a further embodiment of the method, there is a provision for the board to be formed using deep drawing and/or stretch forming and/or stamping and raising in step b). Deep drawing is a variant of tensile compression forming and enables open hollow bodies to be produced. Deep drawing can be used in mass production and is therefore particularly suitable for the production of parts for vehicles. Stretch forming is a tension deformation process and is characterised for example by simple, cost-effective implementation. During forming, a preferably distanced hold-down clamp can be used in order to ensure the least stretching of the material possible.

In a further embodiment of the method, the suggestion is made that the board be formed such that a butt joint or a lap joint is created. Both a butt joint and a lap joint are good preparation for subsequent welding. The welding of the longitudinal gap can therefore be carried out without further preparatory steps immediately after the forming steps.

A further embodiment of the invention provides for the boards to be formed such that the cross section on both ends of the open profile is approximately U-formed. This shape is preferably formed after step b) and before step c), in other words after the forming of the channel and before the subsequent forming of the lateral surfaces into a hollow profile. The cross sectional shape preferably displays mirror symmetry. This shape is shown by way of an example in step V of FIG. 2 and FIG. 3.

In accordance with a further embodiment of the invention, the suggestion is made that the boards are formed such that the cross section in the centre of the open profile is approximately W-formed. This shape is preferably also forms after step b) and before step c), in other words after the forming of the channel and before the subsequent forming of the lateral surfaces into a hollow profile. The cross sectional shape preferably displays mirror symmetry. This shape is shown by way of an example in step V of FIG. 2 and FIG. 3.

In a further embodiment of the method, there is finally a suggestion that in step d) the longitudinal gap is joined by means of welding, soldering, adhesion or a mechanical joining method. Welding, soldering and adhesive processes are all firmly bonded joining processes. Welding achieves heat-resistant connections with a high level of strength. Adhesive processes, however, have the advantage of a low energy requirement and the avoidance of structural changes in the area surrounding the join caused by heat. Alternatively, the longitudinal gap can be joined by means of a mechanical joining process.

BRIEF DESCRIPTION OF THE DRAWINGS

The invention is described in greater detail below using a drawing which merely shows one preferred embodiment of the invention, in which:

FIG. 3 shows a lateral view of the production of a closed hollow profile from a board by means of the method in accordance with the invention in seven steps, FIG. 4A shows a front view of a closed hollow profile produced by means of the method in accordance with the invention, FIG. 4B shows a plan view of the closed hollow profile from FIG. 4A, FIG. 4C shows a lateral view of the closed hollow profile from FIG. 4A.

DETAILED DESCRIPTION OF THE INVENTION

Figure 1:
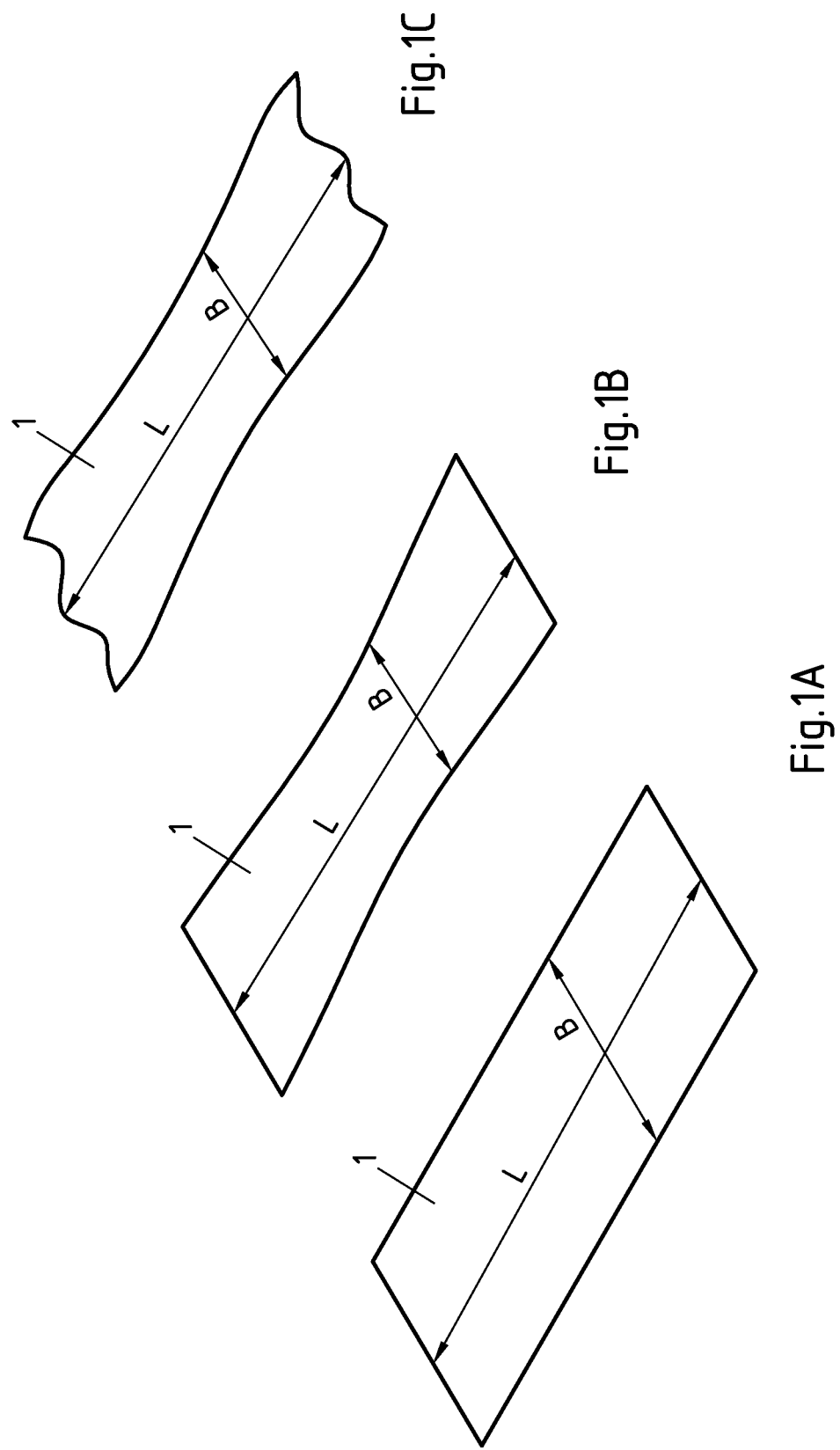
FIG. 1A shows a board made of sheet metal with a rectangular shape.
FIG. 1B shows a tailored blank made of sheet metal.
FIG. 1C shows a tailored blank cut near to the end contour.

FIG. 1 shows a board 1 made of a metal sheet which can be formed or shaped into a hollow profile in the method in accordance with the invention. The board 1 initially has a rectangular shape (rectangular board) and has a length L in the longitudinal direction and a width B in a transverse direction (FIG. 1A). After forming step b), the rectangular board is subjected to a forming cut, in particular of the edges running in a longitudinal direction. The board 1 is alternatively a tailored blank (FIG. 1B) having several lengths L transverse in a longitudinal direction and several widths B longitudinal in a transverse direction and a corresponding mould contour. The tailored blank is preferably deep drawn with a distanced hold-down clamp during forming step b), wherein a cut (final cut) is only carried out after joining. A further board 1 is alternatively shown in FIG. 1C, which as a tailored blank cut near to the end contour has several lengths L transverse in a longitudinal direction and several widths B longitudinal in a transverse direction and a corresponding mould contour.

Figure 2:
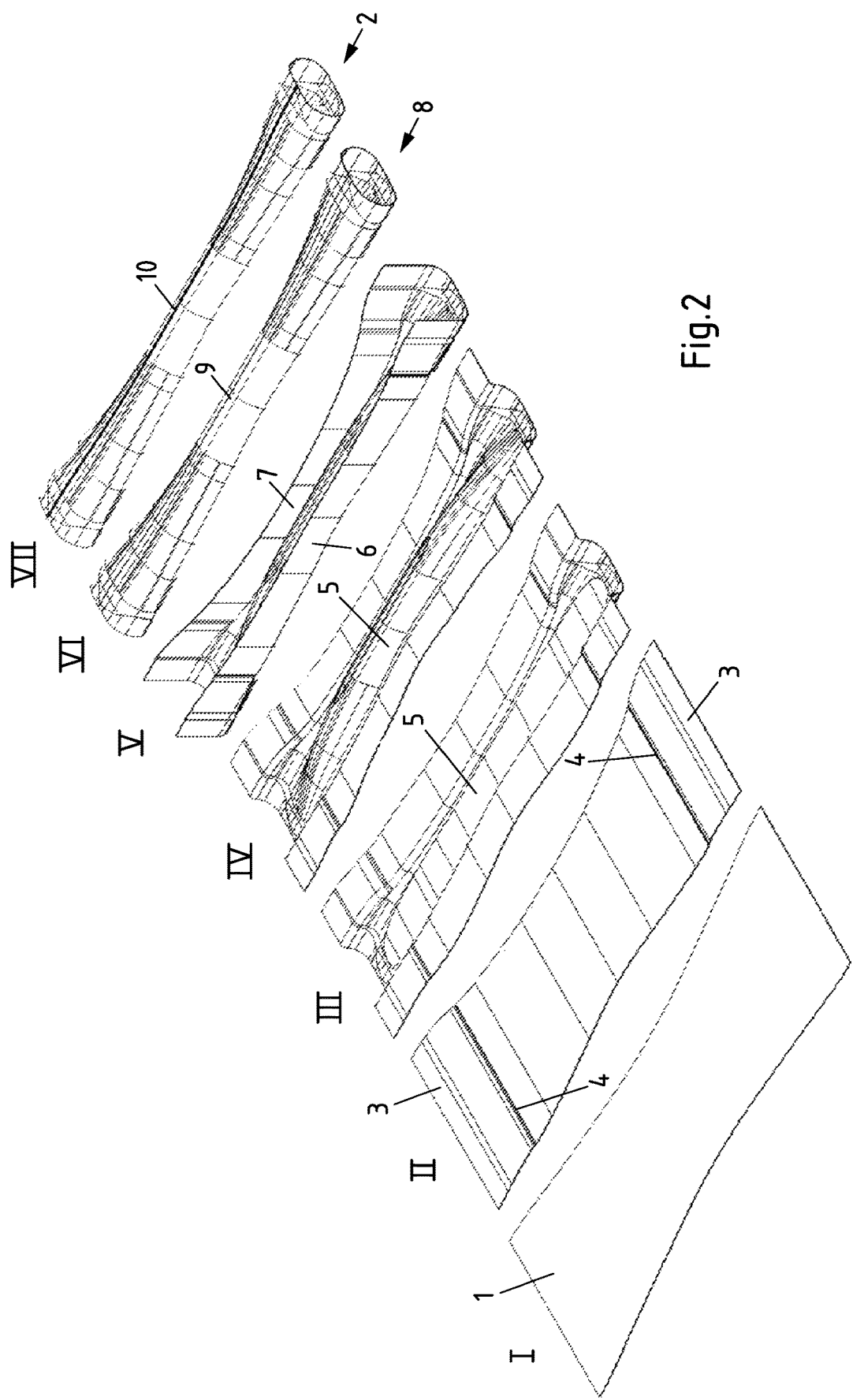
FIG. 2 shows a perspective view of the production of a closed hollow profile from a board by means of the method in accordance with the invention in seven steps.

FIG. 2 shows a perspective view of the production of a closed hollow profile from a board 1 by means of the method in accordance with the invention in seven steps. FIG. 3 shows a lateral view of the production of a closed hollow profile 2 from a board 1 by means of the method in accordance with the invention in seven steps. The seven steps are designated I-VII in both FIG. 2 and FIG. 3.

In step I, a flat board 1 made out of sheet metal is provided. The board 1 was cut on the longitudinal edges and corresponds to the board 1 shown in FIG. 1B. In step II the board 1 was formed in the region of the two ends 3 such that an indentation 4 was created in each case. Deep drawing and/or stretch forming is then used to form the board 1 such that an open profile with a channel 5 running in a longitudinal direction of the board 1 is created (step III). In step IV, the channel 5 was deformed in the opposite direction and then had a curved shape. The lateral surfaces 6, 7 of the board 1 running adjacent to the central channel 5 were then formed in the direction of the channel 5 (step V). The lateral surfaces 6, 7 of the board 1 were then further formed to create a hollow profile 8 with a longitudinal gap 9 (step VI). A closed hollow profile 2 is finally generated by means of the welding of the longitudinal gap (edge joint), wherein a welded seam 10 connecting the two lateral surfaces 6, 7 is created (step VII).

FIG. 4A shows a front view of a closed hollow profile produced using the method in accordance with the invention, FIG. 4B shows a plan view of the closed hollow profile 2 from FIG. 4A and FIG. 4C shows a lateral view of the closed hollow profile 2 from FIG. 4A. As can be identified on the two uneven ends of the hollow profile 2 in FIG. 4A and in FIG. 4B in particular, a board 1 with cut transverse edges was used to produce the hollow profile 2. A board 1 of this type is shown by way of an example in FIG. 1C.

Figure 5:
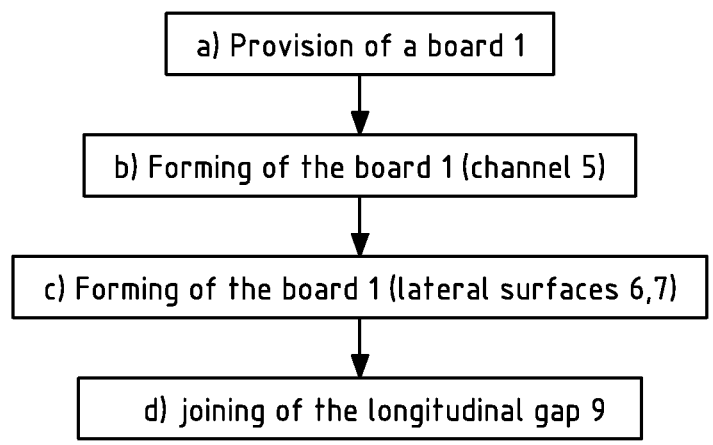
FIG. 5 shows a schematic view of the progression of a method in accordance with the invention.

Finally, FIG. 5 shows a schematic view of the progression of a method in accordance with the invention. The method comprises the following steps: a) provision of a board 1, b) forming of the board 1 (channel 5), c) forming of the board 1 (lateral surfaces 6, 7) and d) joining the longitudinal gap 9 (edge joint).

LIST OF REFERENCE NUMERALS

1: Board
2: Closed hollow profile
3: End (of board 1)
4: Indentation
5: Channel
6, 7: Lateral surfaces (of board 1)
8: Hollow profile
9: Longitudinal gap
10: Welded seam
L: Length (of board 1)
B: Width (of board 1)
U: Circumference (of the hollow profile 8)

The invention claimed is:

1. A method for the production of a closed hollow profile for a vehicle axle comprising the following steps:
   a) providing a board made of sheet metal, wherein the board has at least a length (L) in a longitudinal direction and at least a width (B) in a transverse direction, wherein lateral surfaces of the board extend in the transverse direction,
   b) forming the board, wherein an open profile having a channel extending in the longitudinal direction of the board is created, wherein the lateral surfaces remain extending in the transverse direction,
   c) forming the board, wherein the channel is deformed in an opposite direction from a direction in which the channel is created in step b), wherein the lateral surfaces remain extending in the transverse direction,
   d) forming the lateral surfaces of the board, wherein a hollow profile having a circumference (U) and having a longitudinal gap is created, and wherein the lateral surfaces of the board are formed to extend in a direction substantially perpendicular to the transverse direction after the channel is deformed in the opposite direction from the direction in which the channel is created in step b); and
   e) joining of the longitudinal gap,
   wherein the board is formed such that a compressive stress is generated at least in a region of the longitudinal gap.

2. The method according to claim 1, wherein the width (B) of the board is larger in at least one place than the circumference (U) of a same point on the hollow profile generated during the forming.

3. The method according to claim 1, wherein the board comprises a high-strength or super high-strength steel.

4. The method of claim 1, wherein the board has a thickness in the range from 0.5 mm to 4.0 mm.

5. The method of claim 1, wherein the board has an elongation at break of less than 21%.

6. The method of claim 1, wherein the board is formed by any of the following methods: deep drawing, and/or stretch forming, and/or stamping and raising.

7. The method of claim 1, wherein the board is formed such that a butt joint or a lap joint is created.

8. The method of claim 1, wherein the board is formed such that a cross section on both ends of the open profile is substantially U-formed.

9. The method of claim 1, wherein the board is formed such that a cross section in the centre of the profile which is open on one side is substantially W-formed.

10. The method of claim 1, wherein the longitudinal gap is joined by any of the following methods: welding, soldering, adhesion or a mechanical joining process.

* * * * *